(12) United States Patent
Greywall (10) Patent No.: US 6,356,689 B1
(45) Date of Patent: Mar. 12, 2002

(54) ARTICLE COMPRISING AN OPTICAL CAVITY

(75) Inventor: Dennis Stanley Greywall, Whitehouse Station, NJ (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/536,344

(22) Filed: Mar. 25, 2000

(51) Int. Cl.[7] .................................................. G02B 6/26
(52) U.S. Cl. .......................... 385/52; 385/147; 359/245; 438/455; 372/50
(58) Field of Search .................. 385/52, 147, 129–132; 359/291, 245, 290; 438/455, 458; 372/45, 50

(56) References Cited

U.S. PATENT DOCUMENTS 6,242,324 B1 * 6/2001 Kub et al. ................... 438/455
6,246,708 B1 * 6/2001 Thornton et al. ............. 372/50

* cited by examiner

Primary Examiner—Phan T. H. Palmer
(74) Attorney, Agent, or Firm—Wayne S. Breyer; Jason Paul DeMont; DeMont & Breyer, LLC

(57) ABSTRACT

An article comprising an optical cavity includes two mirrors, at least one of which is advantageously movable, that are spaced from and parallel to one another. In some embodiments, both mirrors are formed from unstressed single crystal silicon. The single crystal silicon used in some embodiments is advantageously sourced from single crystal silicon-on-insulator ("SOI") wafers. In a method in accordance with the present invention, a first mirror is patterned in the thin silicon layer of a first SOI wafer. A standoff is disposed on the thin silicon layer near the first mirror. The thin silicon layer of a second SOI wafer is attached to the standoff such that there is a gap between the two, spaced, thin silicon layers. The thin silicon layer of the second SOI wafer is released forming a movable mirror by removing the thick layer of silicon and the buried oxide from that wafer.

27 Claims, 10 Drawing Sheets

ARTICLE COMPRISING AN OPTICAL CAVITY

FIELD OF THE INVENTION

The present invention relates generally to optical devices. More particularly, the present invention relates to an optical cavity having micron-sized dimensions and suitable for creating optical interference effects.

BACKGROUND OF THE INVENTION

Optical cavities suitable for generating controllable optical interference effects (hereinafter simply "optical cavities") are known and used in the art. Such controllable optical interference effects have been used, for example, to modulate, attenuate, equalize and filter optical signals. Optical cavities are thus a key operative element of a variety of optical devices.

One type of optical cavity, known as the Fabry-Perot etalon, normally consists of two high and equal reflectivity dielectric mirrors that are separated by a gap. The mirrors, which are usually aligned so that they are parallel, have a nominal thickness equal to one-quarter of a wavelength of the optical signal being processed. The etalon exhibits a reflectivity (e.g., a controllable optical interference effect) that is a function of the distance between the mirrors (i.e., the gap) and the properties of the mirrors.

Typically, one of the mirrors of the etalon is movable while the other mirror is non-movable. The movable mirror is moved, in most cases, by applying a voltage to electrodes that overlie and underlie the movable mirror. As the movable mirror is urged towards the non-movable mirror, the gap changes. In such manner, the reflectivity of the etalon is controllably varied.

With the advent of micromachining techniques, devices with optical cavities having dimensions measured in microns have been fabricated. The optical cavity of such micron-sized devices is usually formed via surface micromachining technologies using layers of silicon nitride or polysilicon. Typical of such surface micromachining technologies are those offered by CHRONOS (formerly the MEMS Microelectronics Center of North Carolina).

CHRONOS offers, among other processes, a three-polysilicon-layer surface micromachining process. The first layer (POLY0) of the three polysilicon layers is "non-releasable" (i.e., remains non-movable) and is used for patterning address electrodes and local wiring on a substrate, such as a silicon wafer. The other two polysilicon layers (POLY1 and POLY2) are "releasable" (i.e., can be rendered movable) and so can be used to form mechanical structures (e.g., movable mirror elements, etc.).

Release is achieved by etching away sacrificial material, typically an oxide layer, that is deposited between the POLY1 and POLY0 layers or the POLY1 and POLY2 layers. Etching produces a thin membrane or layer of polysilicon that "floats" above the underlying polysilicon layer, defining a cavity therebetween. The floating or "released" portion is potentially movable (e.g., via application of a voltage). When appropriately dimensioned, such an arrangement is suitable for creating a Fabry-Perot etalon or other types of optical cavities.

Companies that manufacture products incorporating such optical cavities may use their own "in-house" fabrication processes, rather than a commercial MEMS foundry such as CHRONOS, to form suspended structures that function as movable mirrors. Such in-house processes typically involve the deposition and selective removal, typically via photolithographic techniques, of various polysilicon, silicon nitride and sacrificial (e.g., oxide) layers.

Whether obtained from outside suppliers or made in-house, optical cavities and methods for their fabrication, as described above, suffer from a variety of drawbacks. Several of such drawbacks are discussed below.

A first of such drawbacks is related to materials selection. In particular, the polysilicon or silicon nitride layer serving as the movable mirror is typically a "stressed" layer (tensile stress for silicon nitride and compressive stress for polysilicon). The stress results from temperature cycling that occurs during deposition/growth of polysilicon or silicon nitride on the underlying sacrificial layer (e.g., silicon dioxide, etc.) since the sacrificial layer necessarily has a coefficient of thermal expansion that is different than that of the overlying polysilicon or silicon nitride layer.

The mechanical properties of the movable mirror/resonant cavity, such as its speed and switching voltage, are dependent upon the level of stress in the movable mirror, with higher stress resulting, at least potentially, in a greater speed. Unfortunately, such stress tends to cause released structures to "curl" or "warp," resulting in unpredictable device response and reliability problems.

Furthermore, prior art "release" type processes for forming optical cavities typically rely on a timed wet etch to remove sacrificial layers that underlie the layer that is to form the movable layer (mirror). Deviations in the timing of the etching step will change the size (i.e., the diameter) of the movable mirror. The size of the movable mirror, and thus the ability to repeatably produce a cavity having a particular response, is dependent to a high degree on a precisely timed etch.

Optical cavities that have a movable mirror formed from silicon nitride, which is an electrical insulator, must have an electrode deposited thereon. The resulting structure thus has an insulator (i.e., silicon nitride) sandwiched by two conductors (i.e., the overlying electrode and the underlying electrode). During operation, charge tends to accumulate on the lower surface of the silicon nitride layer. Since it is difficult to fully discharge the silicon nitride layer, control of the movable mirror becomes problematic.

The art would therefore benefit from improved fabrication methods and improved optical cavities resulting therefrom.

SUMMARY OF THE INVENTION

Some embodiments of the present invention provide an optical cavity for generating optical interference effects without some of the disadvantages of the prior art. In particular, some embodiments of the present optical cavity, and a method for forming such a cavity:

do not incorporate a stressed layer;

do not require a timed etch; and do not have an insulator between electrodes.

The present optical cavity, and improved optical devices comprising such a cavity in accordance with the present teachings, include two mirrors, one of which is advantageously movable, that are spaced from and parallel to one another. In some embodiments, both mirrors are formed from unstressed single crystal silicon.

The single crystal silicon used in some embodiments of the present invention is advantageously sourced from single crystal silicon-on-insulator (hereinafter "SOI") wafers. Such wafers include a buried insulator layer that is sandwiched between two layers of silicon. One of the layers is a "thin"

(i.e., 0.1 to 1.5 microns) layer of silicon that is used for forming movable and non-moving mirrors. The other of the two layers is a "thick" layer of silicon (i.e., 0.5 to 0.7 millimeters).

In an illustrative method in accordance with the present invention, a non-moving mirror is patterned in the thin silicon layer of a first SOI wafer. A standoff is disposed on the thin silicon layer near the mirror. The thin silicon layer of a second SOI wafer is attached to the standoff such that there is a gap between the two, spaced, thin silicon layers.

The thin silicon layer of the second SOI wafer is released forming a movable mirror by removing the thick layer of silicon and the buried oxide from that wafer. The movable mirror, the non-moving mirror patterned in the first SOI wafer, and the gap therebetween define an optical cavity.

In single crystal SOI wafers, the thin silicon layer that forms the movable mirror is "zero" stress, thus avoiding the warping/curling problems of prior art stressed layers. Furthermore, as the various layers that require removal for defining the cavity or releasing the movable mirror are not "buried" (i.e., do not underlie layers that must be preserved), a wet etch is not required. Rather, reactive ion etching is advantageously used for such etch steps, thereby avoiding the critical timing issues of a wet etch. Since the silicon mirrors are conductive (the mirrors are usually doped to improve such conductivity), the charge accumulation problem experienced with silicon nitride mirrors is avoided.

DETAILED DESCRIPTION

Figure 1:
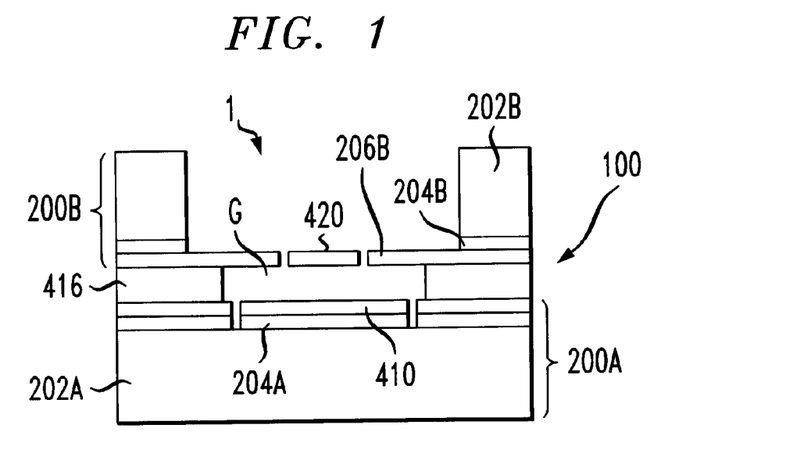
FIG. 1 depicts an embodiment of an optical cavity in accordance with the present teachings.

FIG. 1 depicts an article 1 including optical cavity 100 in accordance with an illustrated embodiment of the present invention. Illustrative optical cavity 100 comprises mirror 420, which is advantageously movable, non-moving mirror 410 and gap G defined therebetween. Standoff 416 is used as a point of attachment for SOI wafers 200A and 200B and further functions to create and maintain gap G between movable mirror 420 and non-moving mirror 410.

In accordance with well known theory, mirrors 410 and 420 have a thickness t that is advantageously given by expression [1], below:

$$t = m\lambda/(4n) \quad [1]$$

where
  m is an odd integer;
  $\lambda$ is the wavelength (peak, center or average for a multiple wavelength signal);
  n is the refractive index of the material comprising the mirror.

Figure 2A:
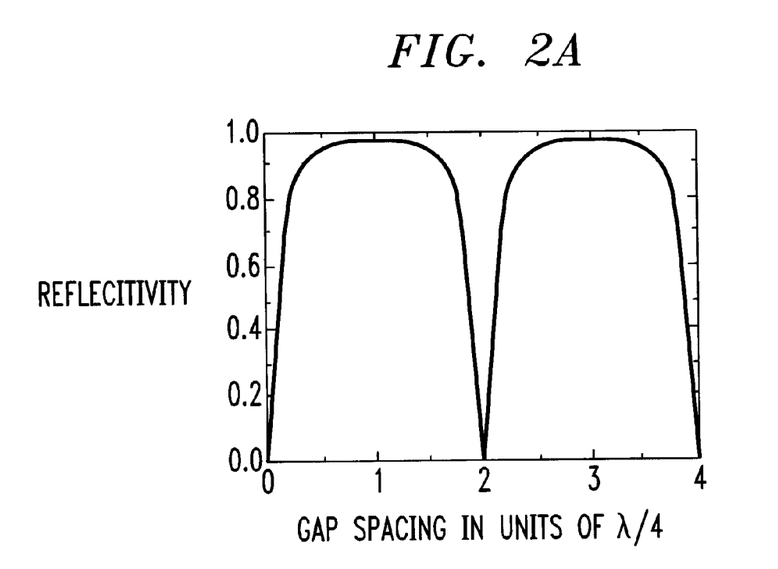
FIG. 2A is a plot (theoretical) that depicts the reflectivity of the optical cavity of FIG. 1 as a function of the size of the gap between the mirrors.

According to expression [1], mirror thickness t is equal to an odd integer multiple of one-quarter of a wavelength of the optical signal that is to be received by optical cavity 100, as measured in the mirror. Given "quarter-wave" mirrors as described above, optical cavity 100 will exhibit relative maxima in reflectivity when gap G is an odd integer multiple of one-quarter of a wavelength of the optical signal. Optical cavity 100 will exhibit relative minima in reflectvity when gap G is an even integer multiple of one-quarter of a wavelength of the optical signal. The theoretical performance of optical cavity 100 is depicted in FIG. 2A.

It should be appreciated that optical cavity 100 can generate optical interference effects in embodiments in which the mirrors are not quarter-wave layers. In such embodiments, the relative reflectivity maxima and minima will occur when gap G has a size that is different than those specified above. Such different sizes are readily determined by those skilled in the art.

It will be recognized by those skilled in the art that optical cavities having a structure that deviates from the basic Fabry-Perot etalon are known, as well. Such deviations, which are made for the purpose of improving some aspect of cavity performance, include, for example, using mirrors that do not have equal reflectivity, deviations from the nominal quarter-wave mirror thickness, and imposing certain mathematical constraints on the relationship between the refractive indices of the two mirrors. Some embodiments of an optical cavity in accordance with the present teachings incorporate such deviations.

Figure 2B:
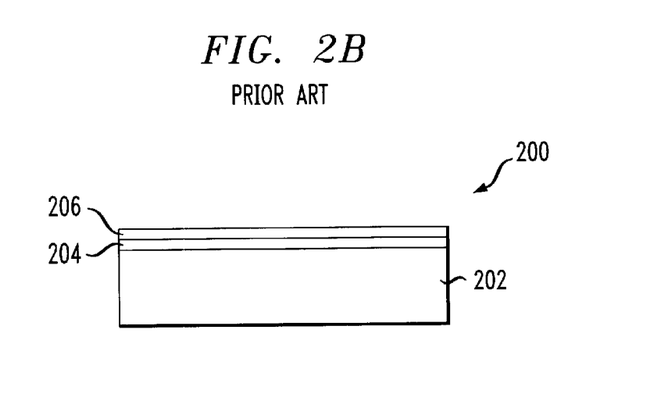
FIG. 2B depicts a commercially available silicon-on-insulator wafer for use in conjunction with the present invention.

In accordance with the present teachings, two single crystal SOI wafers 200A and 200B are advantageously used to fabricate optical cavity 100. The previously described advantages relating to ease of fabrication and device performance result from using SOI wafers, and, more preferably, from using single crystal SOI wafers. FIG. 2B depicts a conventional SOI wafer 200.

SOI wafer 200 has a bulk or "thick" silicon layer 202, an electrically insulating layer 204 disposed thereon, and a "thin" silicon layer 206 that is disposed on insulating layer 204.

Insulating layer 204 is typically an oxide layer (e.g., silicon dioxide) that is grown on thick silicon layer 202 (i.e., a silicon wafer). Insulating layer 204 is sometimes referred to as a "buried" layer, since it is sandwiched between the two silicon layers. Insulating layer 204 has a thickness that falls in a range of about 0.2 to 3 microns, as desired.

Thin silicon layer 206 is advantageously "grown" on insulator layer 204 via a hydrogen ion implantation step. Thin silicon layer 206 has a thickness that is in a range of about 0.1 to 1.5 microns, as desired. SOI wafers formed as described above are available from SOITEC USA, Inc. of Peabody, Mass. Thick silicon layer 202 has a thickness that is typical for that of silicon wafers, usually about 525 microns to 725 microns as a function of wafer diameter. Further information concerning such SOI wafers is available at the SOITEC web site at http://www.soitec.com.

Given a typical optical communications wavelength of 1.55 microns, and using silicon mirrors, a quarter wave mirror has a thickness t=1.55 m/(4×3.5)=0.11 microns (where m=1). As noted above, an SOI wafer having a thin silicon layer 206 that is 0.11 microns thick (to a high degree of accuracy) is readily obtained from fabricators such as SOITEC USA.

In conjunction with the present invention, buried insulator 204 is advantageously comparable in thickness to thin silicon layer 206 (e.g., typically about 1.5 to 3 times the thickness of thin silicon layer 206).

Given mirrors formed from silicon having a refractive index of 3.5 and an optical signal having a wavelength of 1.55 microns, optical cavity 100 will be in exhibit a relative maxima in reflectivity at 1.55 m/(4×1)=0.39 microns (where m=1 and air is in the gap). Thus, in one embodiment, standoffs 416 separate movable mirror 420 and non-moving mirror 410 by 0.39 microns when movable mirror 420 is in its quiescent (non-energized) position.

Continuing with the example, placing a voltage across movable mirror 420 and non-moving mirror 410 generates an electrostatic force of attraction that causes mirror 420 to moves towards mirror 410, thereby decreasing gap G. In the present example, as gap G decreases, the reflectivity of optical cavity 100 decreases towards a relative minima when movable mirror moves a distance $\lambda/4$ towards non-moving mirror 410.

In the example given, if movable mirror 420 moves a distance $\lambda/4$, it will disadvantageously contact non-moving mirror 410. Thus, gap G should be appropriately sized (e.g., $3\lambda/4$) to avoid such contact. Furthermore, small "bumps" of an electrically insulating material can be deposited on one or both of the mirrors to prevent the mirrors from contacting one another.

Figure 2C:
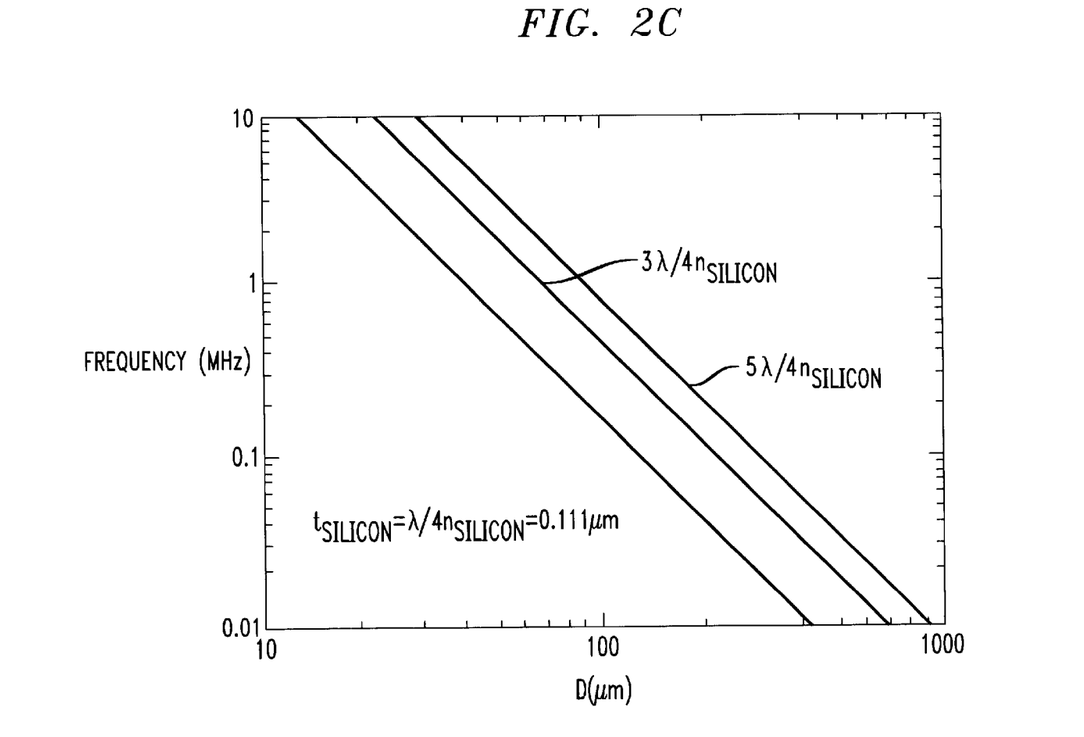
FIG. 2C is a plot (theoretical) that depicts the resonant frequency of the movable mirror depicted in FIG. 1 at a 1.55 micron operating wavelength as a function of the diameter D and thickness t of the movable mirror.

FIG. 2C is a plot (theoretical) that depicts the resonant frequency of movable mirror 420 as a function of its diameter D and thickness t for a 1.55 micron operating wavelength.

Figure 3:
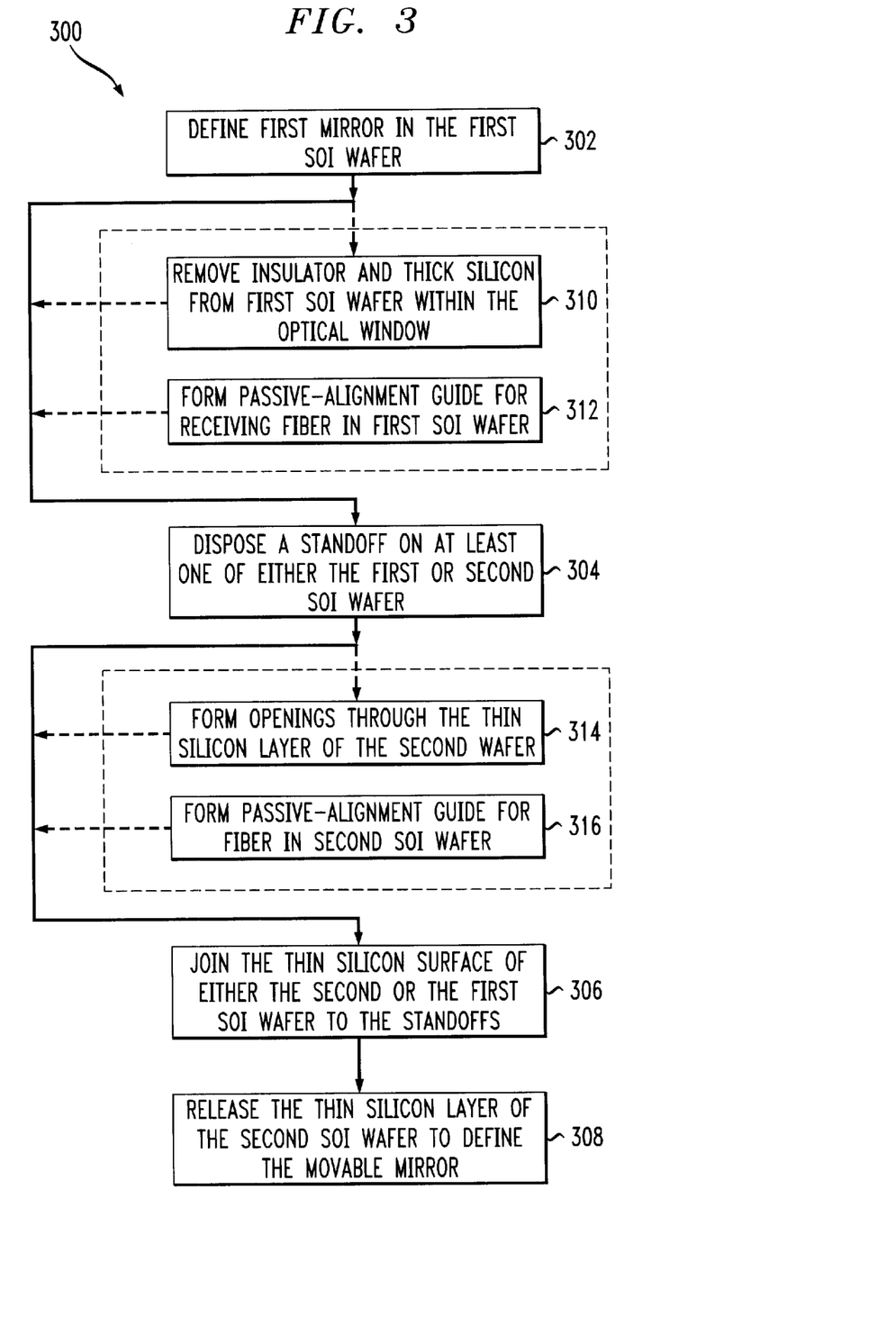
FIG. 3 depicts a block diagram of an illustrative method for forming an optical cavity in accordance with the present teachings.

FIG. 3 depicts an illustrative method 300 for forming optical cavity 100 in accordance with the present teachings. The method is described below in conjunction with FIGS. 4A–4H and 5A–5c. The operations used in method 300 involve standard, well known processing techniques, such as, for example, deposition and/or growth methods, patterning and etching techniques, and wafer bonding techniques. Such methods and techniques are well known, and those skilled in the art will be able to suitably select and apply such techniques, as a function of the materials being used, to form optical cavities and devices utilizing such optical cavities, in accordance with the principles presented herein. As such techniques are well known, they will not be discussed herein, other than to mention their use, as appropriate.

Moreover, it should be understood that while the operation blocks depicting steps of inventive method 300 and the Figures depicting stages in the fabrication of optical cavity 100 are presented in a particular sequence, the depicted sequence is illustrative and is not intended to be limiting. It will be clear to those skilled in the art that in other embodiments of the present method, many of the depicted operations may be carried out in an order different from that shown.

Figure 4A:
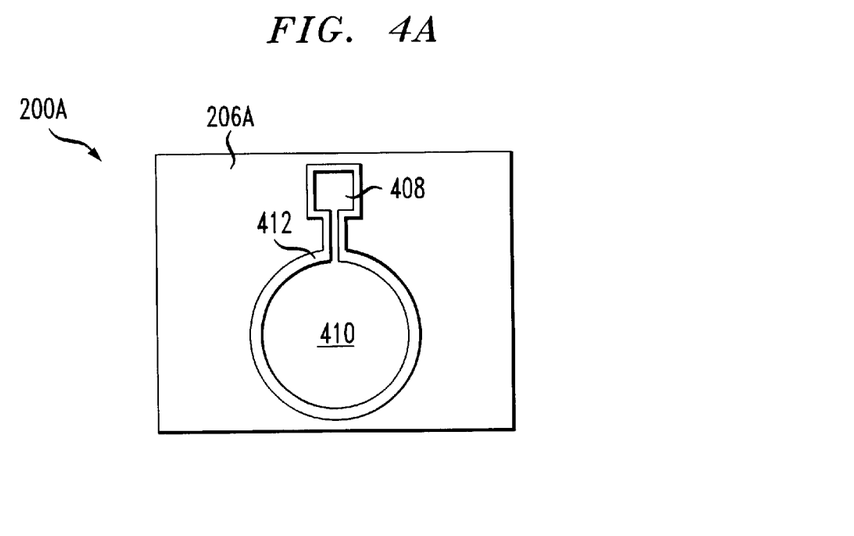
FIGS. 4A–4D depict a first SOI wafer at various stages during the fabrication of an optical cavity in accordance with the illustrative method of FIG. 3.
Figure 4B:
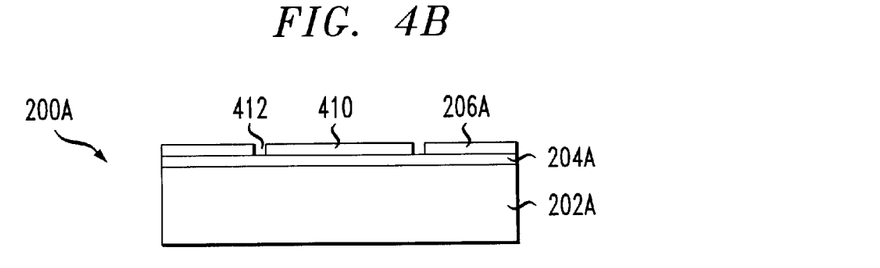

In accordance with operation 302 of method 300, a mirror/electrode is defined in a first SOI wafer. Operation 302 is depicted in FIGS. 4A and 4B, which show respective top and side views of first SOI wafer 200A. As depicted in those Figures, electrical contact pad 408 and mirror 410 are defined by electrically isolating regions of thin silicon layer 206A from the rest of the thin silicon layer. Such electrical isolation is accomplished, in one embodiment, by etching a trench 412 through thin silicon layer 206A. Etching is advantageously performed via reactive ion etching ("RIE"), well known in the art, although other etching methods, wet or dry, may suitably be used.

In accordance with operation 304 of method 300, standoff 416 is disposed on either first SOI wafer 200A (or on second SOI wafer 200B or on both the first and second SOI wafers). As previously described, the two mirrors 410 and 420 defining optical cavity 100 are separated by a precisely defined gap G. In the illustrated embodiments, gap G is formed by disposing standoff 416 between the mirrors, as indicated in operation 304.

Figure 4C:
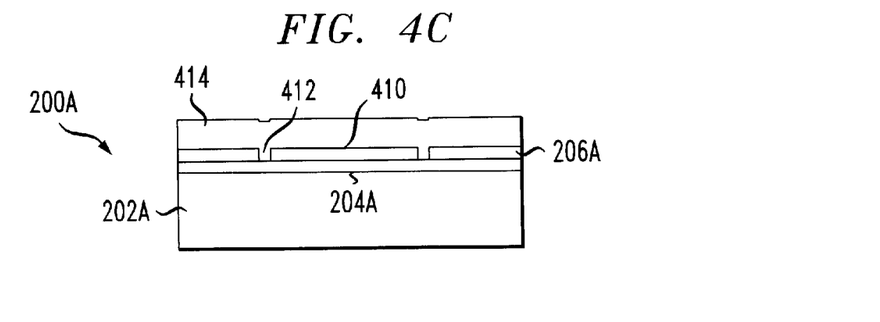
Figure 4D:
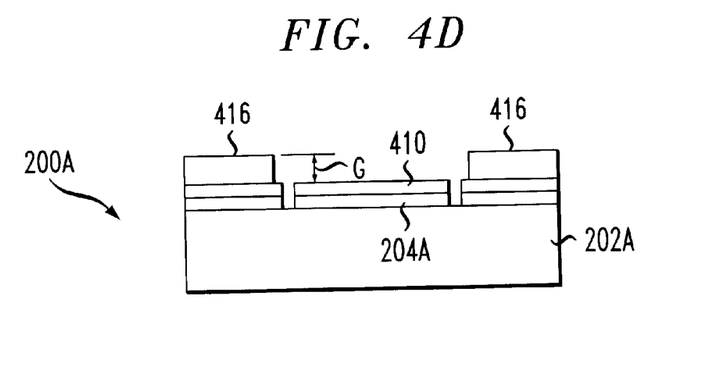
Figure 4E:
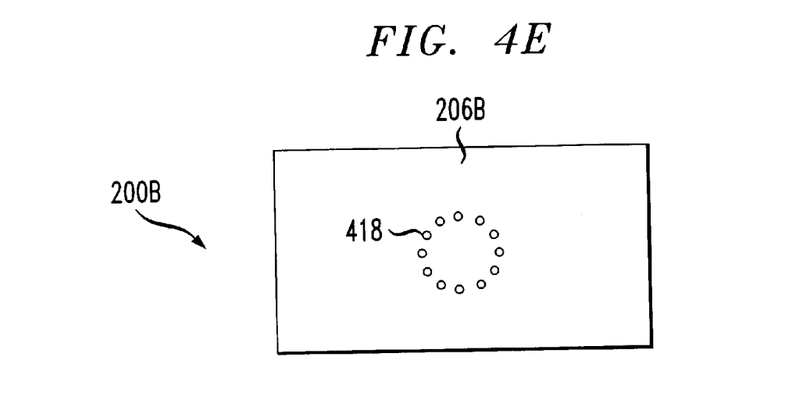
FIGS. 4E and 4F depict respective top and side views of a second SOI wafer during the fabrication of an optical cavity in accordance with the illustrative method of FIG. 3.
Figure 4F:
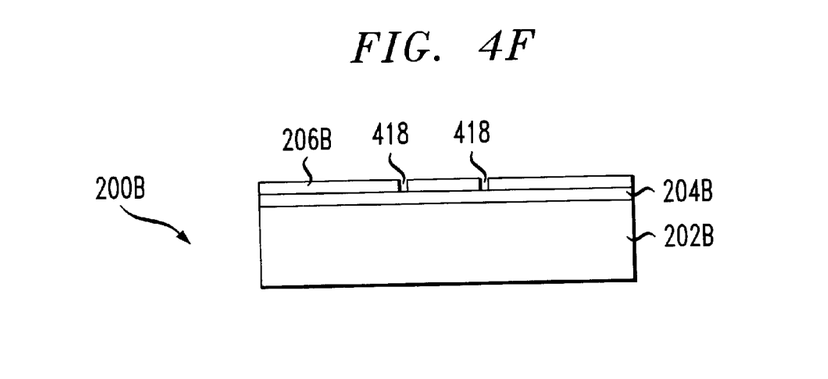

In the illustrated embodiment, standoff 416 is formed by growing/depositing a layer 414 of material on thin silicon layer 206A, and then appropriately patterning and etching layer 414, as depicted in FIGS. 4C and 4D. The height of standoff 416 determines the size of gap G (as measured when movable mirror 420 is in its quiescent state). As a consequence, layer 414 is deposited/grown to a height appropriate for gap G.

Layer 414 advantageously comprises an oxide that is grown on thin silicon layer 206A, and, in such embodiments, RIE is advantageously used to etch layer 414. Since trench 412 is filled with the material comprising layer 414, the etch of layer 414 continues through the trench since silicon is not present to stop it) and through buried insulator layer 204A to thick silicon layer 202A (see FIG. 4D).

In some embodiments of illustrative method 300, SOI wafer 200A is processed further to provide additional features to resulting optical cavity 100. Such further processing is described later in this Specification in conjunction with the discussion of optional operations 310, 312 and FIGS. 4H and 5A–5C. Such further processing can be performed before or after SOI wafer 200A is joined to a second SOI wafer 200B. In other embodiments, the processing of SOI wafer 200A ends with the completion of operations 302 and 304.

In some embodiments, illustrative method 300 continues by joining first SOI wafer 200A to a second SOI wafer 200B (operation 306). In other embodiments, optional processing operations are performed before joining operation 306. Description of joining operation 306 is deferred until after a description of optional processing operation 314, wherein openings are formed in thin silicon layer 206B of second SOI wafer 200B (see FIGS. 4E and 4F).

In the absence of sufficient damping, movable mirror 420 tends to ring or vibrate (after moving from its quiescent position to its actuated position or vice versa). Since the optical properties of the optical cavity change as a function of the position of the movable mirror, such ringing will affect the performance of the optical cavity.

At operating frequencies less than about 1 MHz, gas that is typically present within the (hermetically sealed) optical cavity (e.g., air, argon, etc.) provides sufficient damping. In particular, the shear flow that is generated in the gas as movable mirror 420 moves downwardly dissipates the kinetic energy of the membrane. At frequencies above about 1 MHz, however, this dissipation mechanism becomes ineffective because the gas does not have time to flow out from beneath the movable mirror. Rather, the gas in the optical cavity is compressed as movable mirror 420 moves downwardly, and, as a result, the gas stores energy like a spring. As a consequence, the movable mirror rings.

Therefore, for embodiments in which optical cavity 100 is to operate at frequencies above about 1 MHz, openings are advantageously formed in movable mirror 420, in accordance with operation 314 of illustrative method 300. Openings or damping holes 418 are provided in appropriate quantity and size to provide an amount of damping sufficient to substantially prevent ringing (i.e., so that the gas within the cavity escapes through the holes in time to avoid the aforedescribed compression). The damping holes 418 are patterned and etched using, for example, a wet etch or RIE. Further details concerning the design of damping holes is provided in U.S. Pat. Nos. 5,659,418 and 5,751,469, both of which patents are incorporated by reference herein.

An additional optional processing operation (i.e., operation 316 for forming a passive-alignment guide in the SOI wafer 200B) can be performed before or after joining operation 306 to provide additional features to resulting optical cavity 100. Such further processing is described later in this Specification in conjunction with FIGS. 4H, 5A–5C and 6A–6C.

Figure 4G:
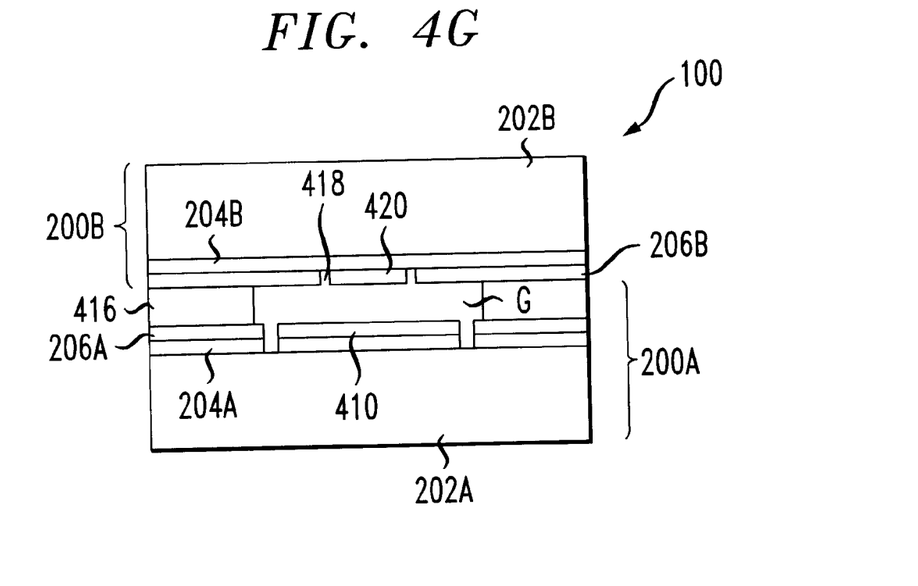
FIG. 4G depicts the first and second SOI wafers bonded to one another.

Returning now to a description of operation 306, first SOI wafer 200A is joined to second SOI wafer 200B. To form optical cavity 100 wherein the two mirrors 410 and 420 are separated by gap G, thin silicon layer of one of the SOI wafers is attached to standoff 416. In the Figures, standoff 416 is depicted as being formed on first SOI wafer 200A. Therefore, in operation 306, thin silicon layer 206B of second SOI wafer 200B is aligned with and joined to standoff 416. The attachment operation is advantageously performed via standard wafer bonding techniques. FIG. 4G depicts the two SOI wafers joined together so that mirrors 410 and 420 are in parallel and opposed relation and separated by gap G.

Up to this point in illustrative method 300, mirror 420 has not been released. While in some embodiments of the present invention, optical cavity 100 has two non-moving mirrors, greater utility is provided by a cavity having a movable mirror. To that end, in some embodiments of method 300, a portion of thin silicon layer 206B of second SOI wafer is released thereby defining movable mirror 420 in accordance with operation 308. It should be understood that while in the illustrated embodiment, mirror 420 is not released until after the two SOI wafers are joined, in alternative embodiments, mirror 410 is released before the joining operation.

Figure 4H:
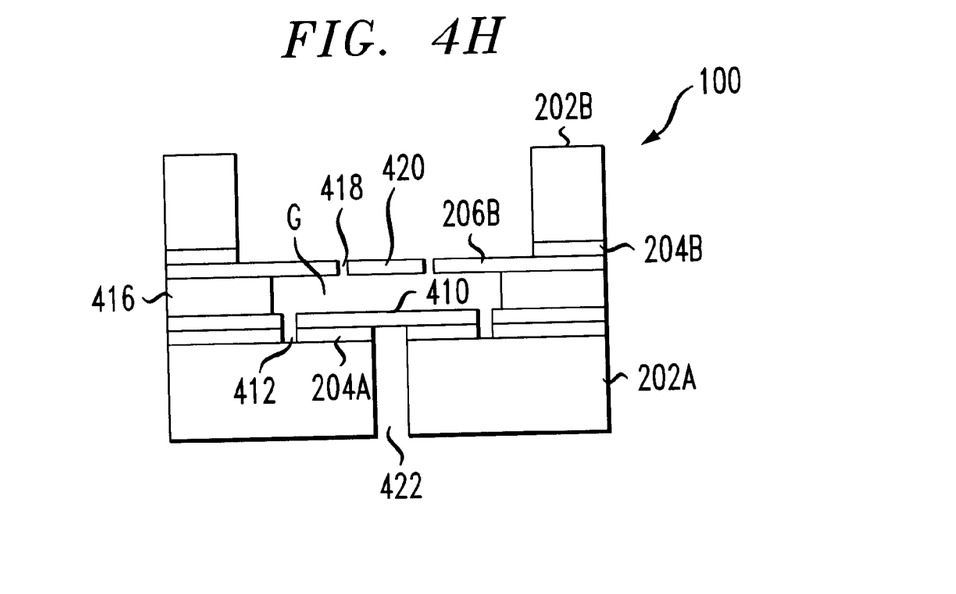
FIG. 4H depicts a further embodiment of an optical cavity in accordance with the present invention wherein an opening is formed beneath the fixed mirror.

As depicted in FIG. 4H, a portion of thick silicon layer 202B and buried insulator layer 204B is removed to release a portion of thin silicon layer 206B. The layers 202B and 204B are advantageously removed using deep RIE. See, U.S. Pat. No. 5,501,893, incorporated by reference herein.

As previously indicated, in some embodiments, the first and/or second SOI is subjected to processing operations in addition to those already described. Such operations are carried out to provide additional features, as described below, to the resulting optical cavity.

With regard to first SOI wafer, in some embodiments, a portion of buried insulator layer 204A and thick silicon layer 202A is removed from "under" first mirror 410 in operation 310. Operation 310 produces a hole or channel 422 that leads to first mirror 410. Removing such layers may improve the reflectivity of mirror 410 and, hence, of optical cavity 100. The plot of cavity reflectivity depicted in FIG. 2A is based on the presence of such a channel. When a portion of the layers underlying mirror 410 are removed, mirror 410 may become somewhat movable upon application of a voltage across mirrors 410 and 420. This effect will simply lower the voltage requirements for changing the size of gap G a given amount.

Moreover, in some embodiments, a passive-alignment guide is formed in first SOI wafer 200A (i.e., operation 312), second SOI wafer 200B (i.e., operation 316) or in both SOI wafers. The passive-alignment guide is physically adapted to receive and passively align an optical fiber with the one of the mirrors. Various embodiments of optical cavity 100 having one or more passive-alignment guides are depicted in FIGS. 5A–5C.

Figure 5A:
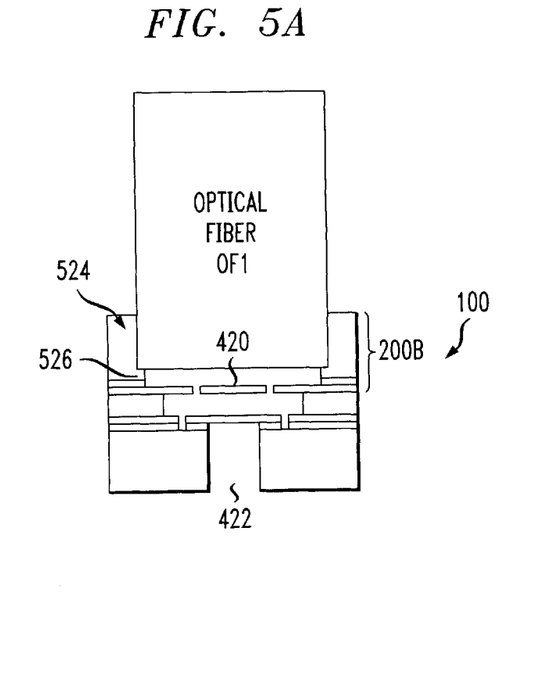
FIGS. 5A–5C depict embodiments wherein one or two optical fibers are in optical communication with an optical cavity in accordance with the present teachings.
Figure 5B:
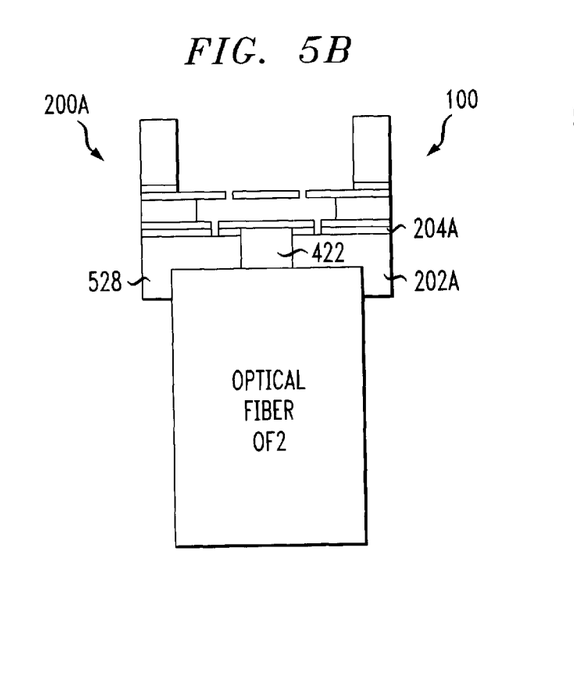
Figure 5C:
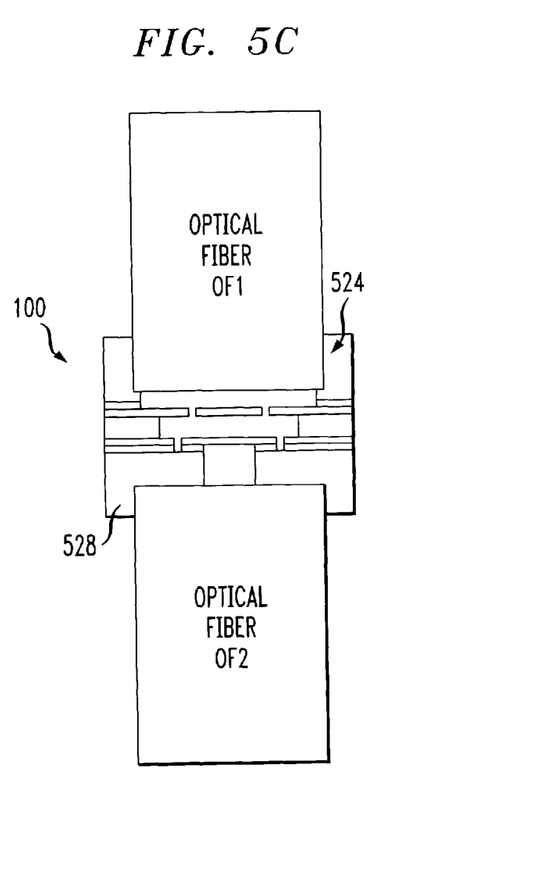

FIG. 5A depicts passive-alignment guide 524 in second SOI wafer 200B. Passive-alignment guide 524 includes lip 526 that functions as a "stop" to prevent optical fiber OF1 from contacting movable mirror 420 during assembly. Passive-alignment guide 524 can be formed during release step 308. To do so, a two-stage etch is advantageously used. One technique for implementing a two-stage etch to form passive alignment guide 524 is depicted in FIGS. 6A–6C.

Figure 6A:
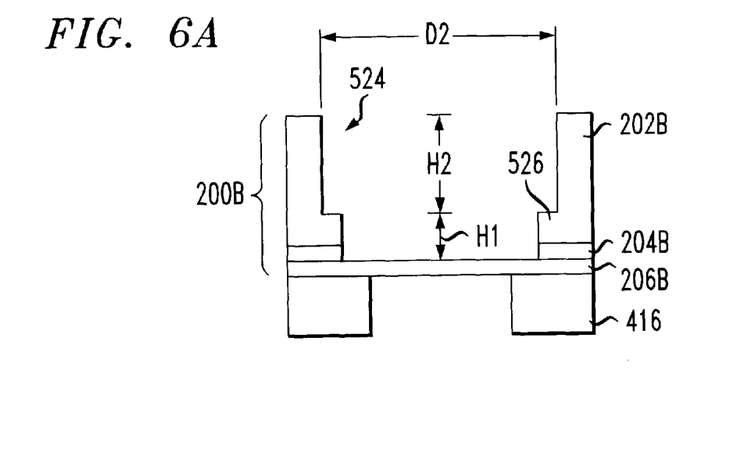
FIGS. 6A–6C depict a two-stage etch for forming a passive-alignment guide.

FIG. 6A depicts second SOI wafer 200B, including passive-alignment guide 524, disposed on standoff 416. First SOI wafer 200A is omitted for clarity. A fiber-receiving portion of passive-alignment guide 524 has a diameter D2 and a height H2. The lip 526 has a diameter D1 and a height H1.

Figure 6B:
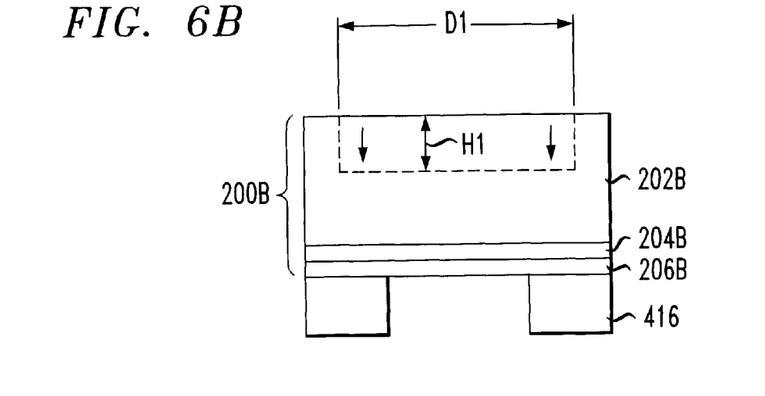

FIG. 6B depicts the portion of thick silicon layer 202B removed by the first-stage etch. The removed portion has a diameter D1 and a height H1 that corresponds to the opening defined by lip 526. The first-stage etch can be performed via RIE.

Figure 6C:
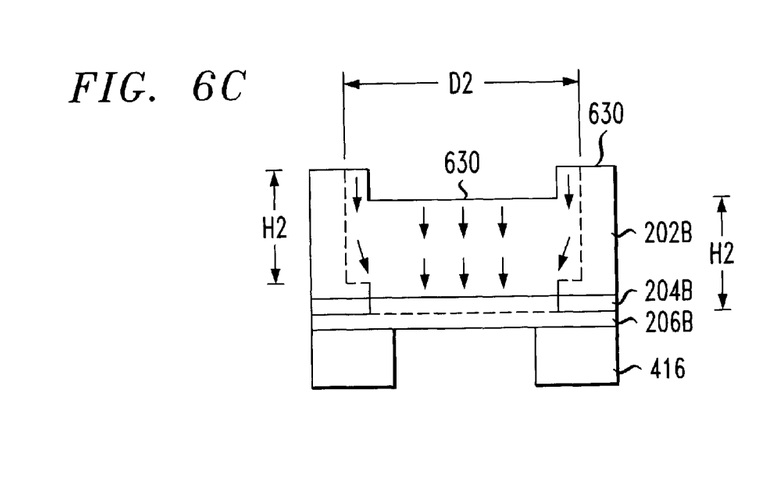

FIG. 6C depicts the second-stage etch, wherein a further portion of thick silicon layer 202B and a portion of buried insulator layer 204B are removed. The etch is now widened to remove a region having a diameter D2 that corresponds to the diameter of the fiber-receiving portion of passive-alignment guide 524. The upper edge 630 of thick silicon layer 202B is etched a distance H2 that corresponds to the height of the fiber-receiving portion of passive-alignment guide 524. The central region of upper edge 630 of thick silicon layer 202B is lower than the outer region of upper edge 630 as a result of the first-stage etch. Since the upper edge 630 is uniformly lowered the distance H2 by the second-stage etch, lip 526 is formed directly above movable mirror 420. Note that the two-stage etch to create passive-alignment guide 524 releases (forms) movable mirror 420. Deep RIE is advantageously used to remove thick silicon layer 202B. A dry etch or a wet etch can be used to remove buried insulator layer 204B.

FIG. 5B depicts passive-alignment guide 528 in first SOI wafer 200A. Passive-alignment guide 528 is advantageously formed using RIE, although other techniques may suitably be used. If, as in the embodiment depicted in FIG. 5B, hole 422 is present, it is advantageously filled with index matching epoxy.

FIG. 5C depicts optical cavity 100 with two passive-alignment guides 524 and 528. Passive-alignment guide 524 places optical fiber OF1 in optical communication with movable mirror 420, and passive-alignment guide 528 places optical fiber OF2 in optical communication with non-moving mirror 410.

As previously mentioned, the sequence in which the various operations of method 300 are carried out is substantially permutable. That is, while FIG. 3 depicts optional operations 310, 312, 314 and 316 occurring at specific times during processing (i.e., before the two SOI wafers are joined), some or all of such operations can be performed after the SOI wafers are joined. And, to the extent that an optical cavity having two non-moving mirrors is desired, release operation 308 that forms movable mirror 420 is not performed.

The foregoing teachings can be applied to fabricate a wide variety of devices that incorporate optical cavities. For example, an optical modulator in accordance with the present teachings results by electrically connecting a controlled voltage source (not depicted) across movable mirror 420 and fixed mirror 410.

More complicated structures incorporating multiple optical cavities can be formed in accordance with method 300. An example of one such structure is spectral equalizer 700, depicted in FIGS. 7A–7I.

Consider an optical network comprising multiple communications channels, each of which channels carries an optical signal having a slightly different wavelength than the signals carried over the other channels. Due in part to the differing wavelengths of the various optical signals, each channel can be expected to exhibit a unique drop in signal strength. As it is undesirable to have signals with such differences in strength propagating through the network, a spectral equalizer is advantageously used to equalize signal strength among the various channels.

Figure 7A:
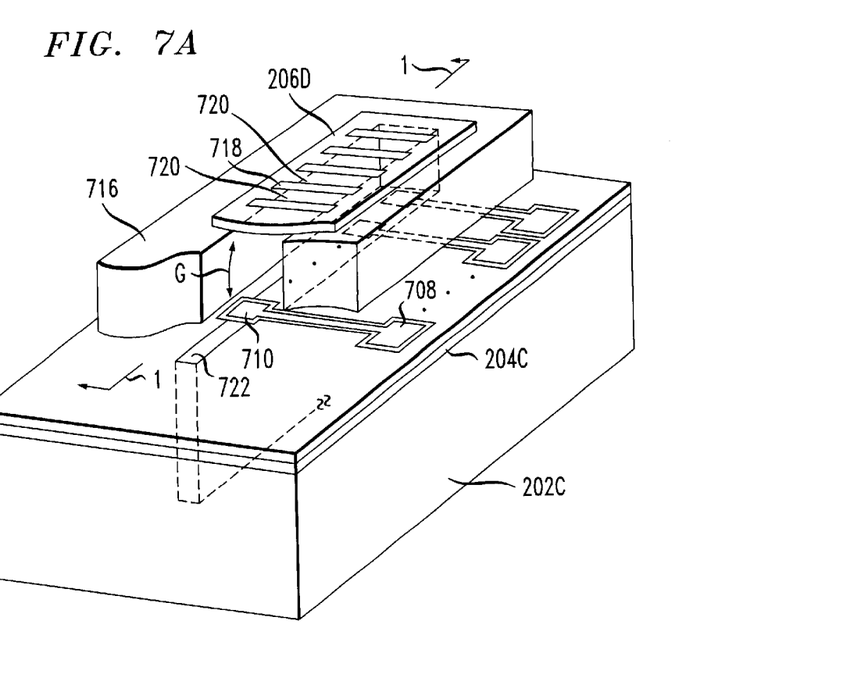
FIGS. 7A and 7B depict an illustrative spectral equalizer in accordance with the present teachings.
Figure 7B:
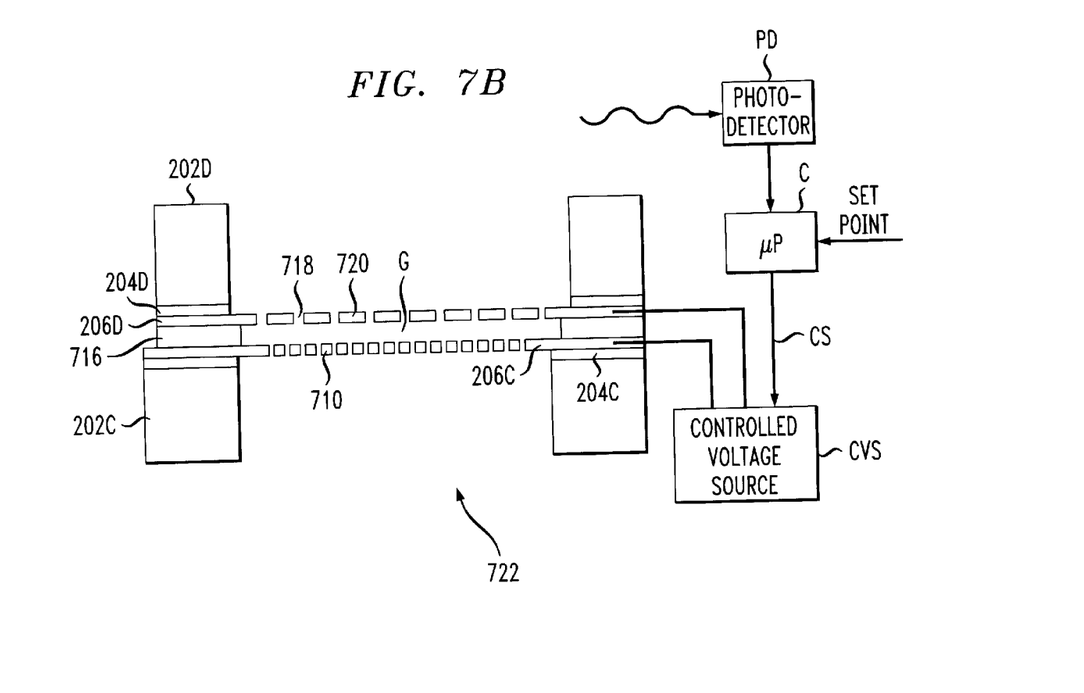

FIG. 7A depicts a cut-away, perspective view of spectral equalizer 700 and FIG. 7B depicts a cross-sectional view along line 1—1. For the sake of clarity, the overlying buried insulator layer 204D and thick silicon layer 202D (of SOI wafer 200D) are not depicted in FIG. 7A (though they appear in FIG. 7B). Spectral equalizer 700 includes a first plurality of movable mirrors 720 and a second plurality of mirrors 710 that are somewhat movable due to trench 722 located under a portion thereof. (Trench 722 improves the reflectivity of mirrors 710.) Each pair of opposed, spaced-apart mirrors 720 and 710 defines an optical cavity. Thus, spectral equalizer 700 has a plurality of optical cavities that are defined by the multiple pairs of spaced-apart mirrors. Since the difference in wavelength of the optical signals in the various channels is quite small, the configuration (i.e., mirror thickness, gap spacing, etc.) for each of such optical cavities is identical.

Each mirror 710 is in electrical communication with an electrical contact pad 708. Each of contact pads 708 is individually electrically connected (individual connections not shown) to controlled voltage source CVS. Similarly, layer 206D in which movable mirrors 720 are defined is electrically connected to controlled voltage source CVS. As voltage is applied to one or more specific electrical contact pads 708, the corresponding one or more overlying movable mirrors 720 move downwardly. As previously described, such movement changes gap G and, hence, the reflectivity of the particular optical cavity.

A plurality of optical signals each having a unique peak wavelength are directed to the optical cavities, one signal per cavity. To reduce the signal strength of any particular signal, voltage is applied to the electrical contact pad 708 of the appropriate cavity. Assuming maximum reflectivity in the absence of applied voltage, any movement away from the quiescent position of the movable mirror will decrease reflectivity. The appropriate movable mirror 720 is moved by application of voltage until the returned signal is attenuated to the desired degree.

The spectral equalizer is advantageously computer controlled and includes an automatic feedback loop. In one embodiment, signal strength is determined by a photodetector PD, and a measure of signal strength is delivered to controller (processor) C and compared to a set point. If a differential exists between the set-point and the data from photodetector PD, a control signal CS is sent to controlled voltage source CVS to decrease or increase voltage to the mirrors on an individual basis, as appropriate.

Spectral equalizer 700 is advantageously formed from two single crystal SOI wafers in the manner previously described and in accordance with method 300. The application of method 300 to the fabrication of spectral equalizer 700 is described below in conjunction with FIGS. 7C–7I.

Figure 7C:
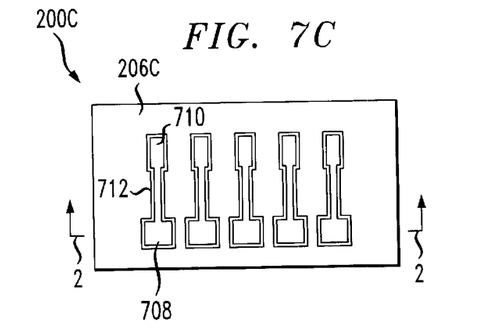
FIGS. 7C–7I depict various stages during the fabrication of the spectral equalizer of FIGS. 7A and 7B in accordance with the present method.
Figure 7D:
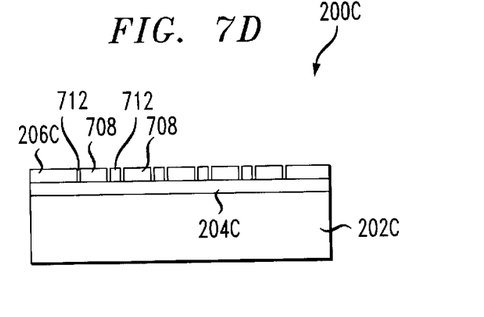

In accordance with operation 302 of method 300, a first mirror is defined in a first SOI wafer. FIG. 7C depicts a top view of a first SOI wafer 200C showing five mirrors 710, with electrical contact pads 708, that are defined in thin silicon layer 206C. Trenches 712 electrically isolate each mirror 710/contact pad 708. FIG. 7D shows a cross section through line 2—2 in the direction indicated (in FIG. 7C). FIG. 7D depicts trenches 712 etched completely through thin silicon layer 206C. SOI wafer 200C has the same structure as the SOI wafers previously described, so that, in addition to thin silicon layer 206C, a buried insulator layer 204C and thick silicon layer 202C are present.

Figure 7E:
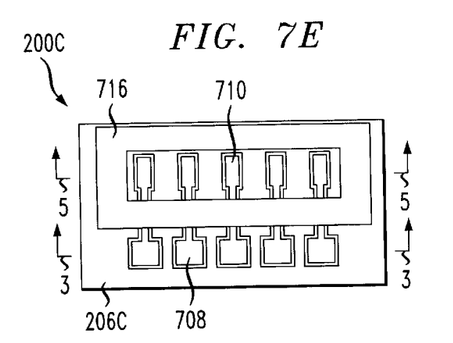
Figure 7F:
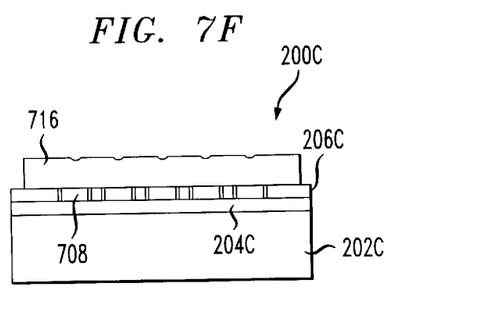

In accordance with operation 304, a standoff is disposed on thin silicon layer 206C of SOI wafer 200C. FIG. 7E depicts standoff 716 overlying and encircling the mirrors 710. Electrical contact pads 708 are located "outside" of standoff 716 to facilitate electrical contact to controlled voltage source CVS. FIG. 7F depicts a view of standoff 716 along line 3—3 in the direction indicated (in FIG. 7E). Trench 722 (see FIG. 7A) is formed in accordance with optional operation 310.

Figure 7G:
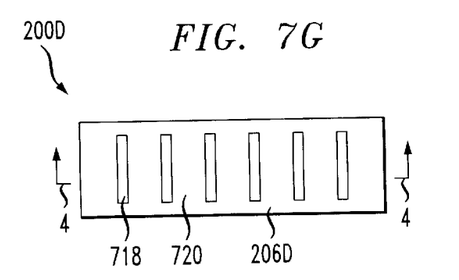
Figure 7H:
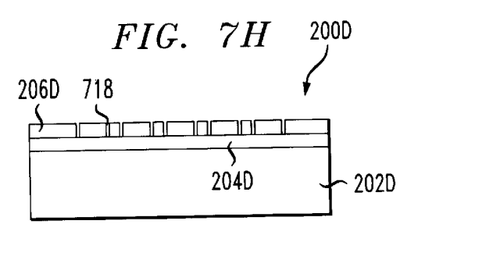

As per optional operation 314, openings are formed through the thin silicon layer of a second SOI wafer. FIG. 7G depicts a top view of second wafer 200D showing openings 718 that are formed in thin silicon layer 206D. In the present embodiment, openings 718 do not function as "damping holes," but rather define a plurality regions 720 therebetween, which regions 720 will form the plurality of movable mirrors. FIG. 7H depicts a cross-sectional view along the line 4—4 in the direction indicated (in FIG. 7G). Openings 718 extend completely through thin silicon layer 206D stopping at buried oxide layer 204D.

Figure 7I:
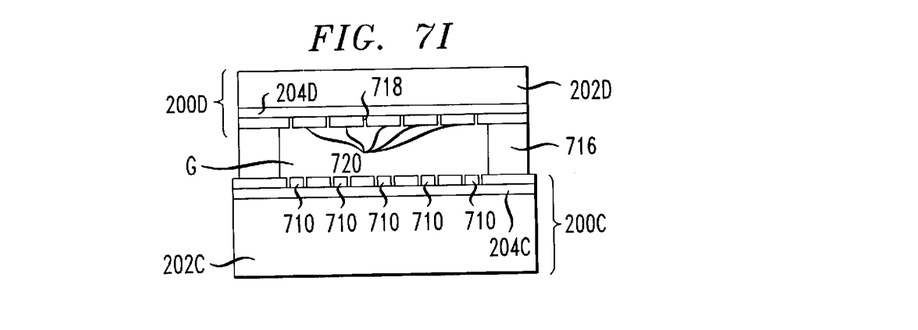

In accordance with operation 306, the two SOI wafers are joined by attaching the thin silicon layer of one of the wafers to a standoff. FIG. 7I depicts a cross-sectional view along the line 5—5 (in the direction indicated in FIG. 7E) and shows thin silicon layer 206D of SOI wafer 200D attached to standoff 716. Mirrors 720 overlie mirrors 710 and are separated by gap G.

Finally, as per operation 308, the thin silicon layer of second SOI wafer is released to define the movable mirror. In the present example, thick silicon layer 202D and buried insulator layer 204D are removed from second SOI wafer 200D, thereby releasing mirrors 720 (see FIG. 7B).

The foregoing example provides an illustration of how method 300 is applied to create a complex, multi-cavity optical device.

Single crystal SOI wafers are advantageously used in conjunction with the inventive method because, among other reasons, the thin silicon layer is a "zero" stress layer. As previously described, stressed layers cause warping of released members. Also, using a conductive material such as doped single crystal silicon avoids the need to add metal to the movable mirror(s) to create an electrode. In cases where metal is added to an otherwise non-conductive movable mirror, the problem of charge build-up on the lower surface of the movable mirror occurs. Moreover, the use of SOI wafers avoids the need for timed etches to create cavities, etc.

It should be understood, however, that in other embodiments of the present invention, single crystal SOI wafers are not used. Rather, a silicon wafer can be oxidized and a thin layer of polysilicon grown on the oxide. Such material will, however, be stressed.

It is to be understood that the above-described embodiments are merely illustrative of the invention and that many variations may be devised by those skilled in the art without departing from the scope of the invention and from the principles disclosed herein. It is therefore intended that such variations be included within the scope of the following claims and their equivalents.

I claim:

1. An article comprising an optical cavity operable to receive an optical signal, said optical cavity comprising:
    a first movable mirror comprising single crystal silicon; and
    a second mirror comprising single crystal silicon that is spaced from said first movable mirror and is in parallel relation thereto.

2. The article of claim 1 wherein said first movable mirror has a thickness that is an odd multiple of one-quarter of a wavelength of said optical signal, as measured in said first movable mirror.

3. The article of claim 2 wherein said second mirror has a thickness that is an odd multiple of one-quarter of a wavelength of said optical signal, as measured in said non-moving layer.

4. The article of claim 1 wherein said first movable mirror comprises a portion of a first single crystal silicon-on-insulator wafer.

5. The article of claim 4 wherein said second mirror comprises a portion of a second single crystal silicon-on-insulator wafer.

6. The article of claim 5 wherein said first single crystal silicon-on-insulator wafer has a guide for receiving and passively aligning a first optical fiber.

7. The article of claim 6 wherein said second single crystal silicon-on-insulator wafer has a guide for receiving and passively aligning a second optical fiber.

8. The article of claim 1 further comprising:
    a controlled voltage source that is electrically connected to said first movable mirror and to said second mirror.

9. The article of claim 8 further comprising a first optical fiber in optical communication with said first movable mirror.

10. The article of claim 9 further comprising a second optical fiber in optical communication with said second mirror.

11. The article of claim 8 wherein the article is a spectral equalizer, the spectral equalizer comprising a plurality of optical cavities, each having:
    a first movable mirror comprising single crystal silicon; and
    a second mirror comprising single crystal silicon that is spaced from said first movable mirror and is in parallel relation thereto.

12. The article of claim 11 wherein all of said second mirrors are defined in a thin layer of single crystal silicon on a first silicon-on-insulator wafer.

13. The article of claim 12 wherein all of said first movable mirrors are defined in a thin layer of single crystal silicon on a second silicon-on-insulator wafer.

14. An article that is formed by:
    defining a first mirror in a thin silicon layer of a first silicon-on-insulator ("SOI") wafer;
    forming a second movable mirror in a thin silicon layer of a second SOI wafer;
    disposing a standoff on one of either said thin silicon layer of said first SOI wafer or said thin silicon layer of said second SOI wafer; and
    joining said first and second SOI wafers via said standoff.

15. The article of claim 14, wherein said thin silicon layer of one of said SOI wafers is attached to said standoff.

16. A method for forming an article having an optical cavity, comprising:
    defining a first mirror on a thin silicon layer of a first silicon-on-insulator ("SOI") wafer;
    attaching a second SOI wafer having a thin silicon layer to said first SOI wafer by:
        forming a standoff on at least one of said first or second SOI wafers, and
        joining said standoff to said thin silicon layer of at least one of said first or second SOI wafers.

17. The method of claim 16 wherein the step of forming a standoff comprises disposing an electrically insulating material on at least one said first or second SOI wafers to a height equal to a desired height of said optical cavity.

18. The method of claim 17 wherein said step of disposing a standoff comprises disposing a layer of oxide on said thin silicon layer of said first SOI wafer.

19. The method of claim 18 wherein said step of joining comprises wafer bonding said second SOI wafer to said standoff.

20. The method of claim 16 further comprising removing a portion of a buried insulator layer and a portion of a thick silicon layer from said first SOI wafer.

21. The method of claim 20 wherein the step of removing further comprises forming a passive-alignment guide in said first SOI wafer for receiving and passively aligning an optical fiber with said first mirror.

22. The method of claim 21 further comprising receiving said optical fiber.

23. The method of claim 16 comprising releasing said thin silicon layer of said second SOI wafer by removing a portion of a thick silicon layer and a buried insulator layer of said second SOI wafer.

24. The method of claim 23 wherein removing further comprises forming a passive-alignment guide in said second SOI wafer for receiving and passively aligning a first optical fiber with the released thin silicon layer.

25. The method of claim 24 further comprising receiving said first optical fiber.

26. The method of claim 24 further comprising forming a passive-alignment guide in said first SOI wafer for receiving and passively aligning a second optical fiber with said first mirror.

27. The method of claim 26 further comprising receiving said first and second optical fibers.

* * * * *